United States Patent
Zan

(10) Patent No.: US 8,789,345 B2
(45) Date of Patent: Jul. 29, 2014

(54) TRANSPORTATION OF SULPHUR FROM SOLID SULPHUR DEPOSITS, IN BLOCKS OF LARGE DIMENSIONS

(75) Inventor: Leonardo Zan, Pesaro E Urbino (IT)

(73) Assignee: SAIPEM S.p.A., San Donato Milanese (IT)

( * ) Notice: Subject to any disclaimer, the term of this patent is extended or adjusted under 35 U.S.C. 154(b) by 99 days.

(21) Appl. No.: 12/440,859

(22) PCT Filed: Sep. 4, 2007

(86) PCT No.: PCT/EP2007/007756
§ 371 (c)(1),
(2), (4) Date: Jul. 2, 2009

(87) PCT Pub. No.: WO2008/031524
PCT Pub. Date: Mar. 20, 2008

(65) Prior Publication Data
US 2010/0031609 A1    Feb. 11, 2010

(30) Foreign Application Priority Data

Sep. 12, 2006  (IT) .................................. MI06A1737

(51) Int. Cl.
*A21C 15/04* (2006.01)
*B65B 35/50* (2006.01)
*B65B 7/08* (2006.01)

(52) U.S. Cl.
USPC ................... 53/435; 53/447; 53/461; 53/513; 53/540; 53/541; 53/168; 53/169; 53/171

(58) Field of Classification Search
USPC ........... 53/435, 447, 461, 465, 513, 540, 541; 83/16, 168, 169, 171, 651.1
See application file for complete search history.

(56) References Cited

U.S. PATENT DOCUMENTS

| 1,419,911 | A | * | 6/1922 | Bacon et al. | 264/308 |
|---|---|---|---|---|---|
| 2,097,639 | A | * | 11/1937 | Perreton | 53/514 |
| 2,201,872 | A | * | 5/1940 | Rottenberg | 53/122 |
| 2,656,123 | A |  | 10/1953 | Smith et al. |  |
| 2,947,578 | A | * | 8/1960 | Hampton et al. | 406/197 |
| 2,994,589 | A | * | 8/1961 | Gleim et al. | 423/575 |
| 3,684,005 | A | * | 8/1972 | Ellithorpe et al. | 165/120 |
| 4,171,200 | A | * | 10/1979 | Jagodzinski et al. | 432/13 |
| 4,517,791 | A | * | 5/1985 | Focke | 53/566 |
| 4,572,303 | A |  | 2/1986 | Marechal |  |
| 4,597,609 | A |  | 7/1986 | Deszynski et al. |  |
| 5,092,468 | A | * | 3/1992 | Slocumb | 206/597 |
| 5,706,872 | A |  | 1/1998 | Schlesinger |  |
| 6,345,726 | B1 | * | 2/2002 | Beeuwsaert | 220/359.3 |

(Continued)

FOREIGN PATENT DOCUMENTS

| CA | 2451712 A1 | * | 3/2004 |
|---|---|---|---|
| CA | 2555722 A1 | * | 3/2004 |

(Continued)

*Primary Examiner* — Stephen F Gerrity
*Assistant Examiner* — Eyamindae Jallow
(74) *Attorney, Agent, or Firm* — Oblon, Spivak, McClelland, Maier & Neustadt, L.L.P.

(57) ABSTRACT

Procedure for the low-risk and zero-emission transportation of sulphur from solid sulphur deposits, in blocks of large dimensions, characterized in that it comprises the formation of blocks of sulphur, having suitable dimensions for being moved, by means of water cut techniques and the wrapping of the blocks obtained in polyethylene sheets.

9 Claims, 1 Drawing Sheet

(56) References Cited

U.S. PATENT DOCUMENTS

| | | |
|---|---|---|
| 7,097,392 B2 * | 8/2006 | Stecher .......................... 406/197 |
| 2004/0117265 A1 * | 6/2004 | Hoffman ......................... 705/26 |
| 2005/0108988 A1 * | 5/2005 | Dickner .......................... 53/393 |
| 2006/0042195 A1 | 3/2006 | Zan et al. |
| 2007/0039437 A1 * | 2/2007 | Lineberry et al. ................. 83/16 |
| 2010/0199818 A1 * | 8/2010 | Lee .................................. 83/16 |
| 2010/0212650 A1 * | 8/2010 | Pedrini ............................ 125/21 |
| 2010/0296909 A1 * | 11/2010 | Mierzewski et al. .......... 414/800 |
| 2014/0045129 A1 * | 2/2014 | Pickren et al. .................... 432/9 |

FOREIGN PATENT DOCUMENTS

| | | |
|---|---|---|
| EP | 0 778 102 | 6/1997 |
| WO | WO 2008155790 A1 * | 12/2008 |
| WO | WO 2010022499 A1 * | 3/2010 |
| WO | WO 2012101002 A1 * | 8/2012 |

* cited by examiner

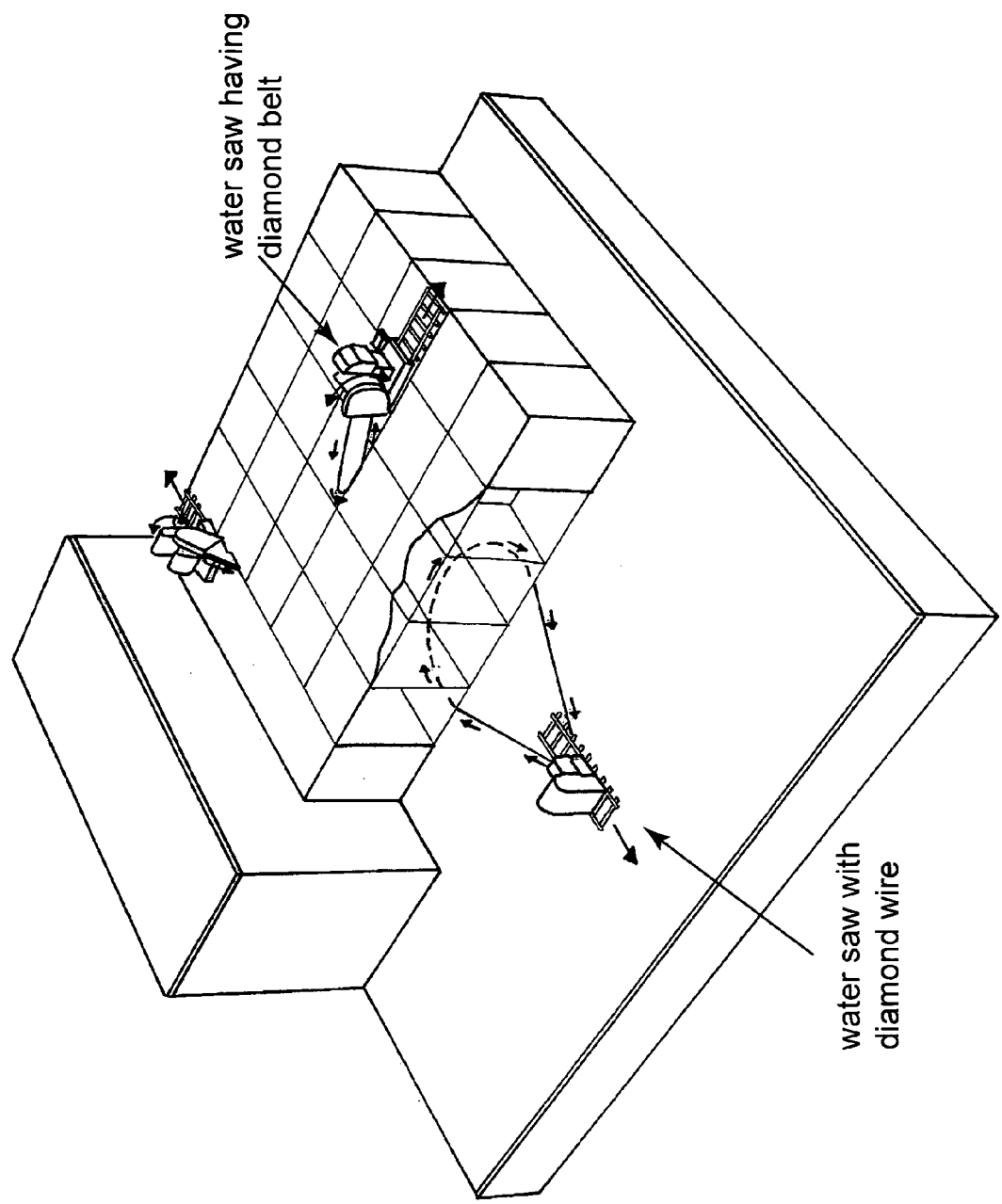

TRANSPORTATION OF SULPHUR FROM SOLID SULPHUR DEPOSITS, IN BLOCKS OF LARGE DIMENSIONS

The present invention relates to a procedure for the low-risk and zero-emission transportation of sulphur from solid sulphur deposits, in blocks of large dimensions (in the order of hundreds of meters).

These large dimensioned blocks can be produced using aluminium panels which are removed after the solidification of the sulphur (pouring) or using reinforced PSE (expanded polystyrene) sheets, as described in the patent application IT-MI2004A001644.

The transportation of sulphur in the solid state, deposited in large dimensioned blocks is effected, after being liquefied, in two different ways:
   in the liquid state, in insulated tanks
   in the solid state, in the form of granulates (pellets) with low powder emissions.

These procedures have several problems relating to:
   serious consequences in the case of accidents and pouring of the liquid (at 130° C.) with pollution of the ground and damage to persons;
   possible explosion of the solid granulates and, in any case, a certain percentage of emissions during transportation, particularly during loading and unloading operations.

We have now found a procedure effected with the use of blocks having suitable dimensions, which allows the drawbacks of the technologies of the known art currently used for the transportation of sulphur, to be eliminated.

The procedure object of the present invention for the low-risk and zero-emission transportation of sulphur from solid sulphur deposits, in large dimensioned blocks, is characterized in that it comprises the formation of sulphur blocks, having suitable dimensions for being moved, by means of water-cut techniques and the wrapping of said blocks obtained, in polyethylene sheets.

More specifically, this procedure preferably comprises the following steps:
   formation of blocks, having dimensions suitable for being moved, by water-cut techniques;
   wrapping of the blocks thus obtained in polyethylene sheets;
   fixing of the blocks on an appropriate base suitable for being moved;
   loading of the blocks onto transportation means.

The water-cut techniques which can be used are those normally used for cutting ornamental stones (marble, granite, etc.) and are substantially of two types:
   with diamond wire;
   with circular water saws.

The diamond wire technique allows long horizontal surface cuts effected with a machine capable of allowing a steel wire with suitably fixed synthetic diamonds to run at a high speed, with water cooling.

The circular saw technique uses a recently patented technique (IT-1180403) which adopts a circular saw with Teflon support, on which synthetic diamonds are fixed.

The polyethylene sheets which wrap the blocks preferably have a thickness ranging from 0.23 to 0.5µ, more preferably from 0.23 to 0.30µ, whereas the number of wrappings preferably ranges from 4 to 10.

An embodiment of the present invention is now provided with the help of the enclosed FIGURE which illustrates the cutting of sulphur blocks with water saws with no powder emission.

A horizontal cut is first effected with a water saw with diamond wire normally used in marble and granite quarries.

The sulphur blocks are subsequently cut with a water saw having diamond belt described in IT-1180403 mentioned above.

The invention claimed is:

1. A process for the transportation of sulphur from solid sulphur deposits, comprising the steps of: cutting blocks of sulphur from solid sulphur deposits having dimensions too large to be moved, by water cutting; and wrapping the blocks thus obtained in polyethylene sheets.

2. The procedure according to claim 1, wherein the polyethylene sheets have a thickness ranging from 0.23 to 0.50 µm.

3. The procedure according to claim 2, wherein the polyethylene sheets have a thickness ranging from 0.23 to 0.30 µm.

4. The procedure according to claim 1, wherein the number of wrappings ranges from 4 to 10.

5. A process for the transportation of sulphur from solid sulphur deposits, comprising the steps of: cutting blocks of sulphur from solid sulphur deposits having dimensions too large to be moved, by water cutting; wrapping the blocks thus obtained in polyethylene sheets; fixing the blocks on a suitable base suitable for being moved; and loading of the blocks onto a transportation device.

6. The procedure according to claim 5, wherein the polyethylene sheets have a thickness ranging from 0.23 to 0.50 µm.

7. The procedure according to claim 6, wherein the polyethylene sheets have a thickness ranging from 0.23 to 0.30 µm.

8. The procedure according to claim 5, wherein the number of wrappings ranges from 4 to 10.

9. A process for the transportation of sulphur from solid sulphur deposits, comprising the steps of: identifying solid sulphur deposits having dimensions too large to be moved; cutting the solid sulphur deposits into blocks, in situ, by water cutting; wrapping the blocks thus obtained in from 4 to 10 wrappings of polyethylene sheets; fixing the wrapped blocks on a suitable base suitable for being moved; and loading of the blocks onto a transportation device.

* * * * *